(12) United States Patent
Varkey et al.

(10) Patent No.: US 10,215,939 B1
(45) Date of Patent: Feb. 26, 2019

(54) FIBER-OPTIC STRENGTH MEMBER COMPONENTS FOR USE IN OUTER STRENGTH MEMBER LAYERS

(71) Applicant: Schlumberger Technology Corporation, Sugar Land, TX (US)

(72) Inventors: Joseph Varkey, Sugar Land, TX (US); Maria Grisanti, Missouri City, TX (US); David Kim, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/686,326

(22) Filed: Aug. 25, 2017

(51) Int. Cl.
*G02B 6/00* (2006.01)
*G02B 6/44* (2006.01)
*G02B 6/02* (2006.01)

(52) U.S. Cl.
CPC .......... *G02B 6/443* (2013.01); *G02B 6/02004* (2013.01); *G02B 6/4486* (2013.01); *G02B 6/4494* (2013.01)

(58) Field of Classification Search
CPC .. G02B 6/443; G02B 6/02004; G02B 6/4486; G02B 6/4494
USPC ................................. 385/100–113
See application file for complete search history.

(56) References Cited

U.S. PATENT DOCUMENTS

| | | | | |
|---|---|---|---|---|
| 4,852,965 A * | 8/1989 | Mullin | ............... | G02B 6/4416 385/101 |
| 6,317,540 B1 * | 11/2001 | Foulger | ............... | G02B 6/4469 324/555 |
| 6,424,768 B1 * | 7/2002 | Booth | ............... | G02B 6/4427 174/116 |
| 6,459,837 B1 | 10/2002 | Fitz et al. | | |
| 6,477,111 B1 * | 11/2002 | Lunde | ............... | G01V 1/201 174/101.5 |
| 7,324,730 B2 | 1/2008 | Varkey et al. | | |
| 8,581,742 B2 | 11/2013 | Viswanathan et al. | | |
| 9,201,207 B2 | 12/2015 | Varkey et al. | | |
| 2006/0140557 A1 * | 6/2006 | Parris | ............... | G02B 6/4429 385/113 |
| 2007/0102188 A1 * | 5/2007 | Glew | ............... | H01B 7/295 174/113 C |
| 2008/0289851 A1 * | 11/2008 | Varkey | ............... | G02B 6/4416 174/115 |
| 2009/0041414 A1 * | 2/2009 | Lavenne | ............... | G02B 6/4495 385/109 |
| 2011/0240312 A1 | 10/2011 | Varkey et al. | | |
| 2011/0243514 A1 * | 10/2011 | Nave | ............... | G02B 6/4459 385/110 |
| 2012/0063731 A1 * | 3/2012 | Fitz | ............... | G02B 6/4495 385/104 |

(Continued)

OTHER PUBLICATIONS

International Search Report and Written Opinion issued in the related PCT Application PCT/US2018/048043, dated Dec. 18, 2018 (10 pages).

*Primary Examiner* — Ryan Lepisto
*Assistant Examiner* — Guy Anderson
(74) *Attorney, Agent, or Firm* — Eileen Pape

(57) ABSTRACT

A cable containing at least one optical fiber in a strength member and methods for manufacturing the strength member and cable are provided. A cable may include a cable core and armor wire strength members that surround the cable core. One of the armor wire strength members that surround the cable core contains an optical fiber.

12 Claims, 21 Drawing Sheets

(56) References Cited

U.S. PATENT DOCUMENTS

| | | | |
|---|---|---|---|
| 2013/0209044 A1* | 8/2013 | Lowell | G02B 6/4436 385/101 |
| 2014/0064681 A1* | 3/2014 | Register, III | G02B 6/4416 385/101 |
| 2014/0367121 A1 | 12/2014 | Varkey et al. | |
| 2015/0043875 A1* | 2/2015 | Bookbinder | G02B 6/4482 385/100 |
| 2015/0170799 A1 | 6/2015 | Varkey et al. | |
| 2015/0234143 A1* | 8/2015 | Smith | G02B 6/4494 702/2 |
| 2016/0025945 A1 | 1/2016 | Wanjau et al. | |
| 2016/0097872 A1* | 4/2016 | Fernihough | G01P 15/18 367/15 |
| 2016/0293297 A1 | 10/2016 | Varkey et al. | |
| 2017/0358385 A1* | 12/2017 | Varkey | H01B 9/005 |

* cited by examiner

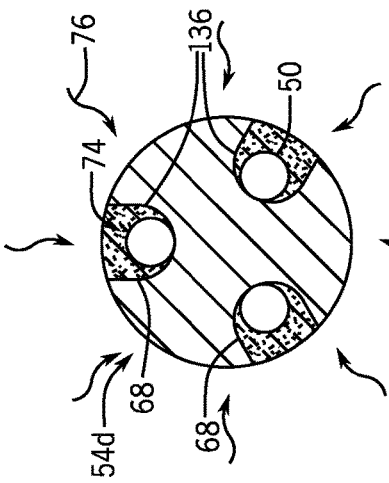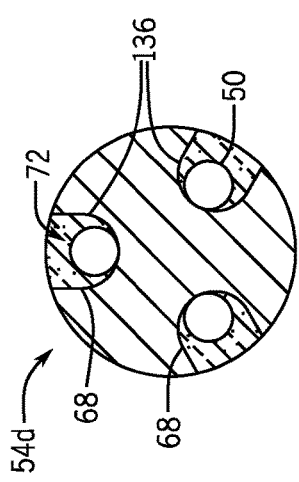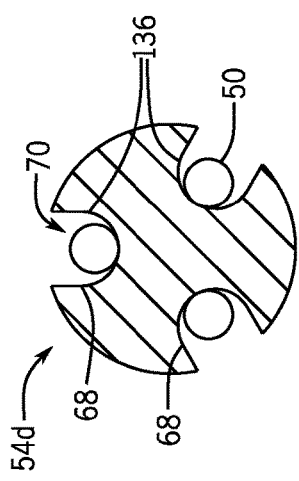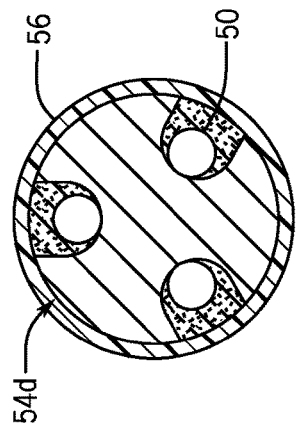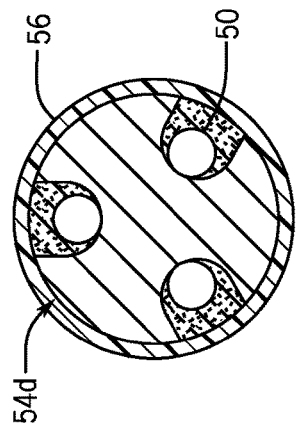

FIBER-OPTIC STRENGTH MEMBER COMPONENTS FOR USE IN OUTER STRENGTH MEMBER LAYERS

BACKGROUND

This disclosure relates to systems and methods for protecting an optical fiber within a downhole cable, seismic cable, or other cable, while reducing a loss of signal quality on the optical fiber.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. Thus, when a wellbore is investigated to determine the physical condition of a fluid within the wellbore, a gas within the wellbore, or the wellbore itself, it may be desirable to place a cable with associated measurement tools and/or sensors within the wellbore.

Such measurement tools and/or sensors may include one or more optical fibers, which may provide high-speed electromagnetic interference (EMI) immune telemetry to a data processing system coupled to the end of the cable. To reduce a chance of potential damage to the optical fibers, the one or more optical fibers may be housed within protective structures in the cable core. Such protection may result in a loss of signal quality from the optical fibers, however, since the cable core is relatively isolated from changes in the wellbore environment due to armor wire strength members which surround and/or protect the cable core.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a cable includes a cable core and a number of armor wire strength members that surround the cable core. A first armor wire strength member of the armor wire strength members includes a first optical fiber.

In another example, a method includes inserting a first optical fiber into a space shaped into one or more wires, enclosing the space to enclose the first optical fiber in an optical-fiber-containing structure, and extruding a first polymer tube over the optical-fiber-containing structure.

In another example, a cable includes a first group of wire members and a second group of wire members disposed circumferentially around a center of the cable. The first group may be a first radial distance from the center of the cable and the second group may be a second, farther, radial distance from the center of the cable. A first wire member of the second group of wire strength members contains a first optical fiber.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 29 is a cross-sectional view of an optical-fiber-containing multichannel structure that includes air as filler material, in accordance with an embodiment of the present disclosure;

FIG. 30 is a cross-sectional view of an optical-fiber-containing multichannel structure that includes a silicon polymer as filler material, in accordance with an embodiment of the present disclosure;

FIG. 31 is a cross-sectional view of an optical-fiber-containing multichannel structure that includes a UV-curable polymer as filler material, in accordance with an embodiment of the present disclosure;

FIG. 32 is a cross-sectional view of the optical-fiber-containing multichannel structure of FIG. 29 that includes an exterior polymer layer, in accordance with an embodiment of the present disclosure;

FIG. 33 is a cross-sectional view of the optical-fiber-containing multichannel structure of FIG. 30 that includes an exterior polymer layer, in accordance with an embodiment of the present disclosure;

FIG. 34 is a cross-sectional view of the optical-fiber-containing multichannel structure of FIG. 31 that includes an exterior polymer layer, in accordance with an embodiment of the present disclosure;

DETAILED DESCRIPTION

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
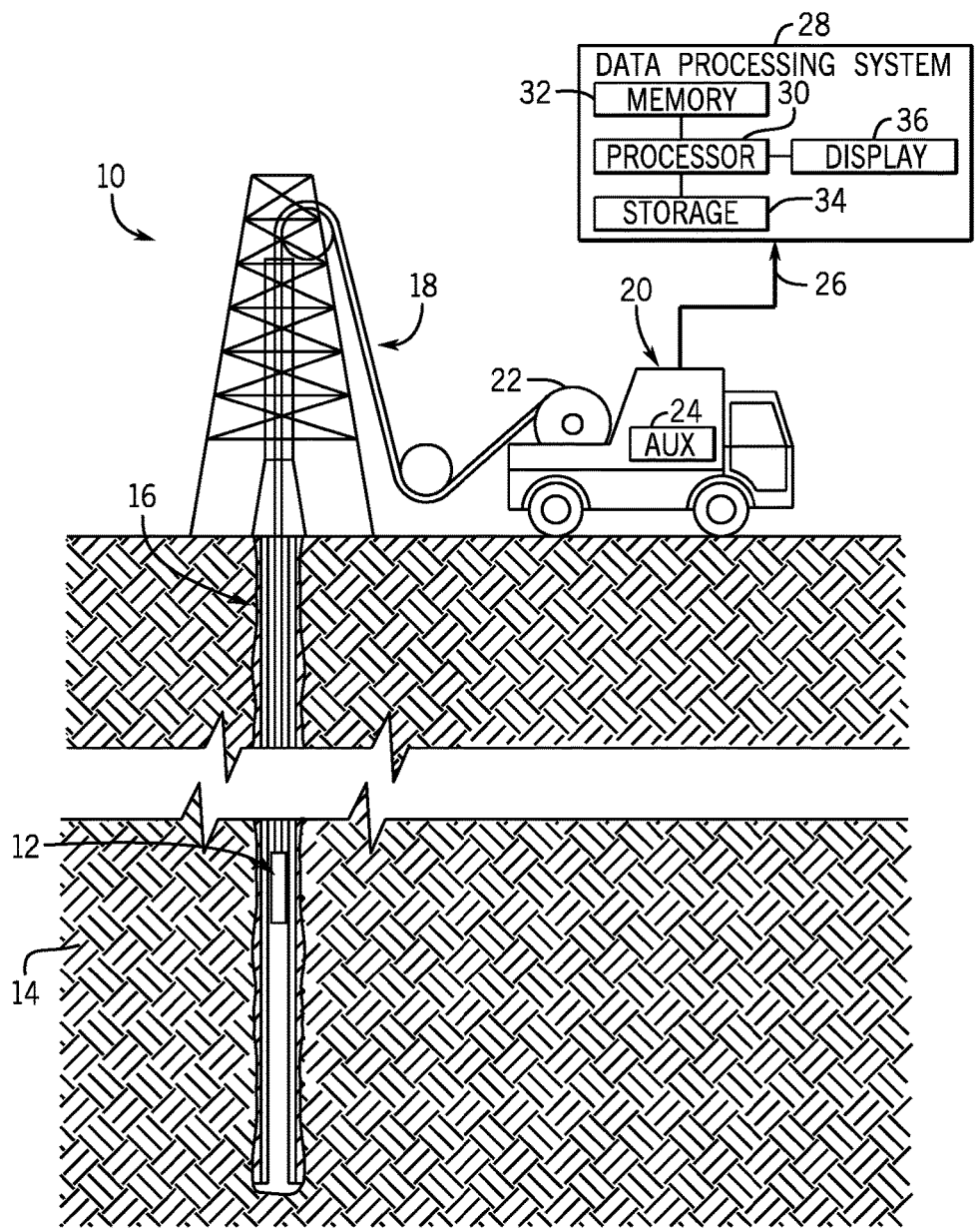
FIG. 1 is a schematic diagram of a wellbore logging system and cable that may obtain data measurements along the length of the wellbore, in accordance with an embodiment of the present disclosure.

With this in mind, FIG. 1 illustrates a well-logging system 10 that may employ the systems and methods of this disclosure. The well-logging system 10 may be used to convey a downhole tool 12 or other weight through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

The cable 18 may additionally contain one or more optical fibers embedded within the cable core or armor wire strength members of the cable 18, which may collect data (e.g., such as temperature, pressure, strain, seismic activity, or other desired parameters) regarding the interior condition of the wellbore 16. The one or more optical fibers may transmit the data to the logging winch system 20.

The downhole tool 12 and/or cable 18 may provide logging measurements 26 to a data processing system 28 via any suitable telemetry (e.g., via electrical signals pulsed through the geological formation 14 or via mud pulse telemetry). The data processing system 28 may process the logging measurements 26 which may indicate certain properties of the wellbore 16 (e.g., temperature, pressure, strain, seismic activity, or other desired parameters) that might otherwise be indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the logging measurements 26.

Figure 2A:
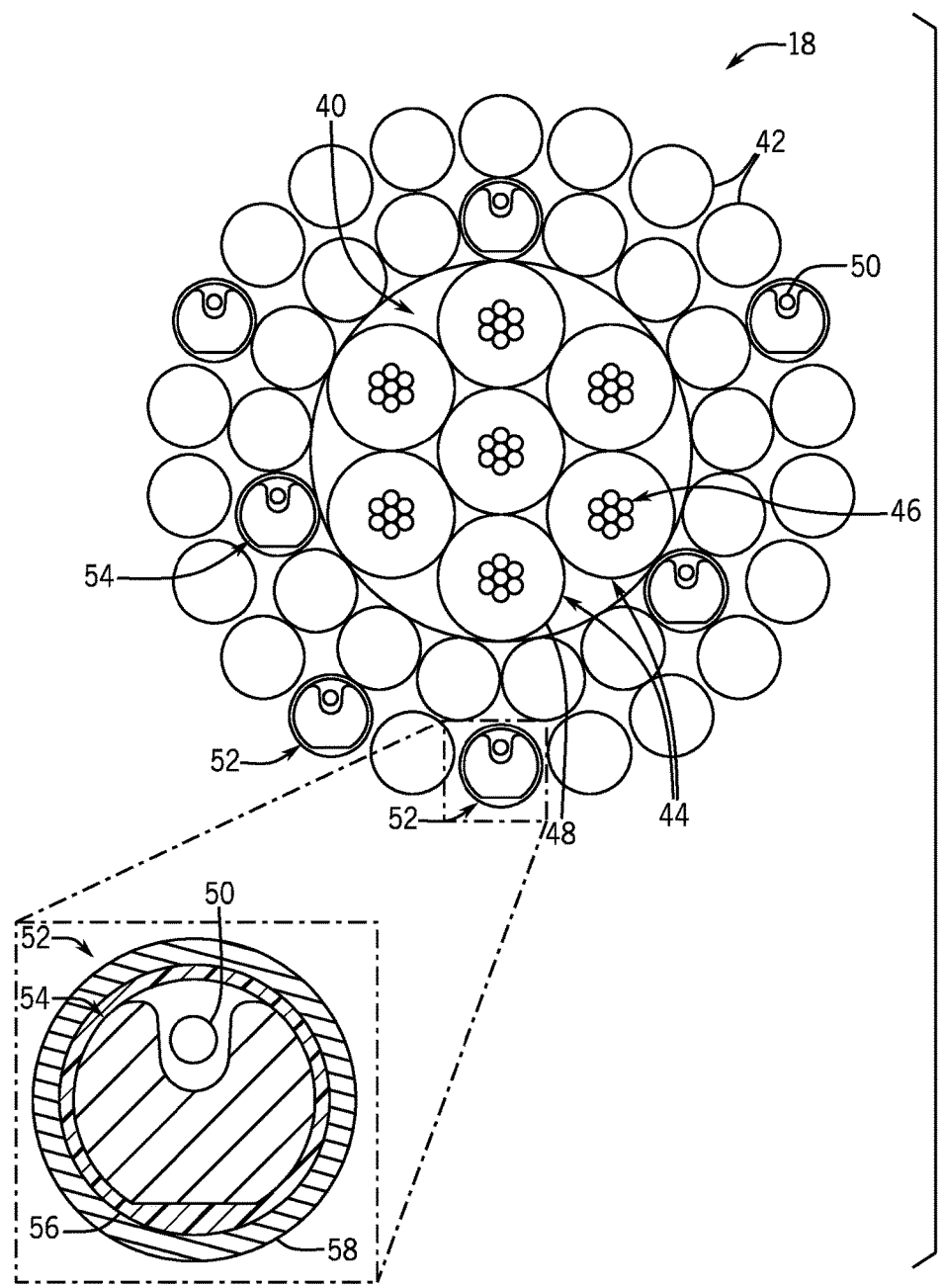
FIG. 2*a* is a cross-sectional view of the cable of FIG. 1, which illustrates an optical fiber cable contained within an optical-fiber-containing armor wire strength member that surrounds a cable core, in accordance with an embodiment of the present disclosure.

FIG. 2a is a cross-sectional view of one embodiment of the cable 18. The cable 18 may house a cable core 40, which may be circumferentially surrounded by one or more armor wire strength members 42. The armor wire strength members 42 may be served (e.g., coiled helically) around the cable core 40, extend longitudinally along the length of the cable core 40, or be disposed about the cable core 40 in any fashion suitable to surround the cable core 40. The armor wire strength members 42 may physically protect the cable core 40 and may provide additional rigidity to the cable 18. In addition, the armor wire strength members 42 may support the weight of the cable 18 and alleviate strain on the cable core 40.

The cable core 40 may include one or more signal cables 44. The signal cables 44 may include internal wires 46 disposed within protective structures 48. The internal wires 46 may include sensors (e.g., one or more optical fibers 50), copper wires, or any other suitable wires desired within the cable 18. The internal wires 46 may transmit instructional signals or electrical power to a component coupled to the end of the cable 18 (e.g., the downhole tool 12). The one or more optical fibers 50 within the cable core 40 may sense internal conditions of the wellbore 16 and relay data regarding the internal conditions to the data processing system 28. The protective structures 48 may encase the internal wires 46 and physically protect the internal wires during operation of the cable 18. Although the one or more optical fibers 50 may be less susceptible to physical damage when housed in the cable core 40, the signal quality of the one or more optical fibers 50 may be diminished in such a configuration. To achieve a better signal to noise ratio in regard to the parameters being monitored (e.g., temperature, pressure, seismic profiling, or others), the one or more optical fibers 50 may be located near the outside perimeter of the cable 18. By disposing the one or more optical fibers 50 within one or more optical-fiber-containing armor wire strength members 52, the one or more optical fibers 50 may be disposed about the perimeter of the cable 18 while still receiving physical protection through the optical-fiber-containing armor wire strength members 52. The optical-fiber-containing armor wire strength members 52 may additionally be disposed within the cable core 40 of the cable 18. Each optical-fiber-containing armor wire strength member 52 may house an optical-fiber-containing structure 54 that includes the one or more optical fibers 50. The optical-fiber-containing structure 54 may be circumferentially encased by a thin polymer layer 56. The thin polymer layer 56 may additionally be encased by a protective shield 58 (e.g., seam welded tube, thick polymer layer, metallic wires).

Figure 2B:
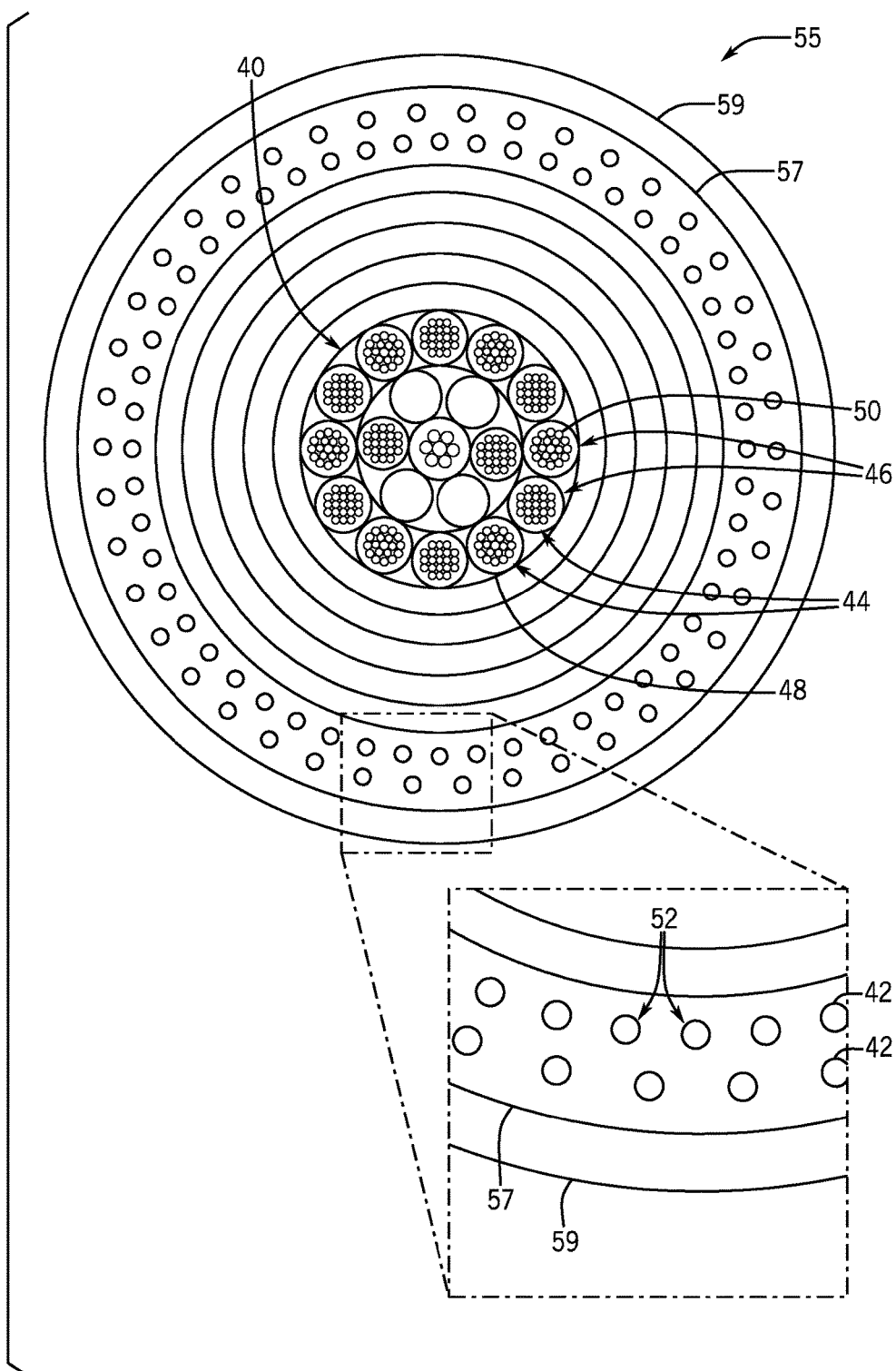
FIG. 2*b* is a cross-sectional view of a marine cable, which illustrates the optical fiber cable contained within the optical-fiber-containing armor wire strength member that surrounds a marine cable core, in accordance with an embodiment of the present disclosure.

FIG. 2b is a cross sectional view of a marine cable 55. The marine cable 55 may include the cable core 40. The cable core 40 may include the one or more signal cables 44. The signal cables 44 may include the internal wires 46 disposed within the protective structures 48. The internal wires 46 may include the sensors (e.g., the one or more optical fibers 50), copper wires, or any other suitable wires desired within the marine cable 55. The internal wires 46 may transmit instructional signals or electrical power to a component coupled to the end of the marine cable 55 (e.g., the downhole tool 12). The protective structures 48 may encase the internal wires 46 and physically protect the internal wires during operation of the marine cable 55. Although the one or more optical fibers 50 may be less susceptible to physical damage when housed in the cable core 40, the signal quality of the one or more optical fibers 50 may be diminished in such a configuration. To achieve a better signal to noise ratio in regard to the parameters being monitored (e.g., temperature, pressure, seismic profiling, or others), the one or more optical fibers 50 may be located near the outside perimeter of the marine cable 55. By disposing the one or more optical fibers 50 within the one or more optical-fiber-containing armor wire strength members 52, the one or more optical fibers 50 may be disposed about the perimeter of the marine cable 55 while still receiving physical protection through the optical-fiber-containing armor wire strength members 52. The optical-fiber-containing armor wire strength members 52 may be disposed within a shielding layer 57 of the marine cable 55. The shielding layer 57 may additionally be encased by a protective outer layer 59. The optical-fiber-containing armor wire strength members 52 may additionally be disposed within the cable core 40 of the marine cable 55.

Figure 3:
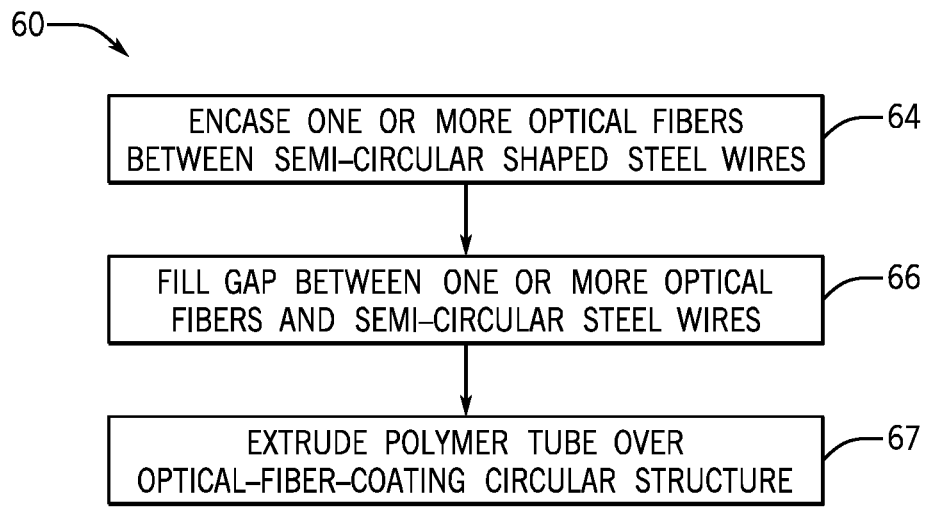
FIG. 3 is a method of manufacturing an optical-fiber-containing circular structure of the optical-fiber-containing armor wire strength member, in accordance with an embodiment of the present disclosure.
Figure 4:
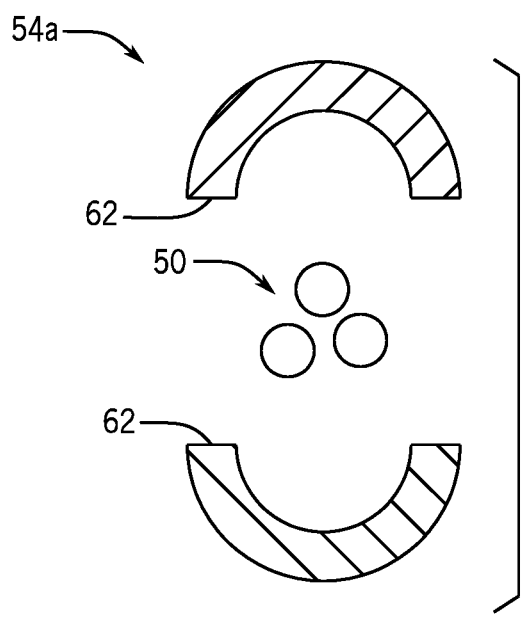
FIG. 4 is a cross-sectional view of the optical-fiber-containing circular structure, in accordance with an embodiment of the present disclosure.
Figure 78:
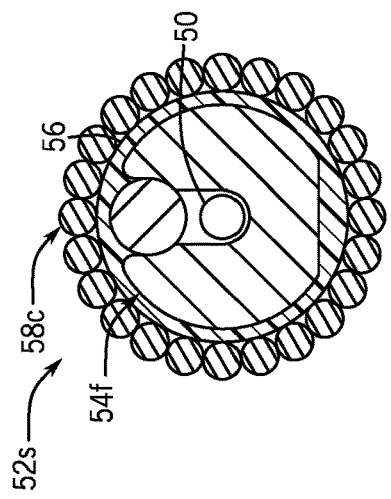
FIG. 78 is a cross-sectional view of an optical-fiber-containing armor wire strength member that includes the optical-fiber-containing plugged structure of FIG. 51 encased by a served wire jacket, in accordance with an embodiment of the present disclosure.

FIGS. 3-78 illustrate various methods of assembly and/or embodiments of the optical-fiber-containing structure 54 of the optical-fiber-containing armor wire strength members 52. FIG. 3 is a method 60 of assembly for an optical-fiber-containing circular structure 54a of the optical-fiber-containing armor wire strength members 52. The optical-fiber-containing circular structure 54a and various embodiments thereof are shown in FIGS. 5-10. Block 64 relates to FIG. 4. The optical-fiber-containing circular structure 54a may include two semicircular (or more than two partially circular) profile steel wires 62, which encase the one or more optical fibers 50. The example of FIGS. 3-10 show two semicircular profile steel wires 62 of substantially equal dimensions, but in some embodiments, one of these may cover greater than a half-circle and another less than a half-circle. In other embodiments, more than two steel wires 62 may have partially semicircular profiles that collectively form a circular shape. In still other embodiments, the steel wires 62 may form a non-circular or oval shape. For the sake of brevity, the steel wires 62 are discussed as being semicircular, but it should be appreciated that any suitable dimensions are contemplated by this disclosure. The semicircular profile steel wires 62 may include galvanized improved plow steel, stainless steel, high carbon steel, or any suitable alloy.

Figure 7:
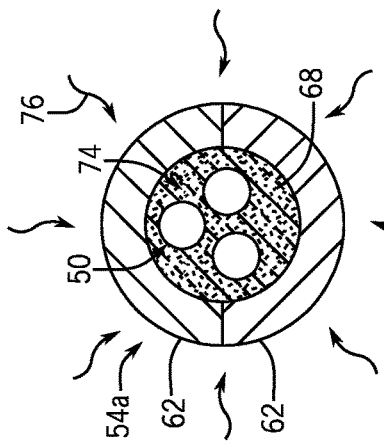
FIG. 7 is a cross-sectional view of an optical-fiber-containing circular structure that includes a UV-curable polymer as filler material, in accordance with an embodiment of the present disclosure.
Figure 6:
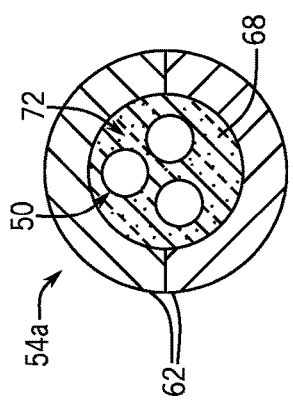
FIG. 6 is a cross-sectional view of an optical-fiber-containing circular structure that includes a silicon polymer as filler material, in accordance with an embodiment of the present disclosure.
Figure 5:
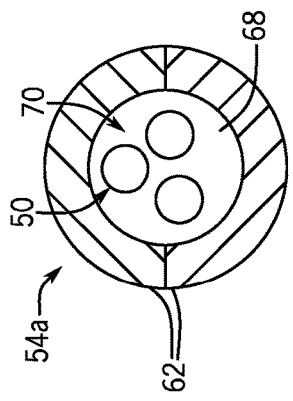
FIG. 5 is a cross-sectional view of an optical-fiber-containing circular structure that includes air as filler material, in accordance with an embodiment of the present disclosure.

Turning now to FIGS. 5-7, which relate to block 66 of FIG. 3, when the two semicircular profile steel wires 62 encase the one or more optical fibers 50, a gap 68 may form between them. The gap 68 may remain empty (e.g., filled with air 70), filled with a soft silicone polymer 72, or filled with a UV-curable polymer 74 that may be hardened using UV-radiation 76, as shown by FIGS. 5-7, respectively. Additionally or alternatively, the gap 68 may be filled with any other suitable filler material. The one or more optical fibers 50 may be encased by a filler material (e.g., air 70, soft silicone polymer 72, UV-curable polymer 74) before being disposed between the two semicircular profile steel wires 62.

Figure 10:
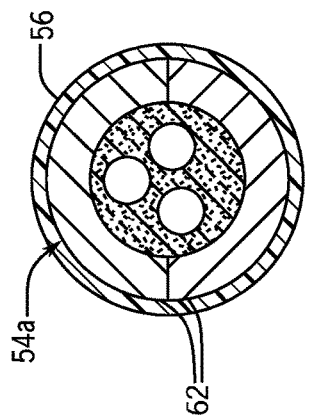
FIG. 10 is a cross-sectional view of the optical-fiber-containing circular structure of FIG. 7 that includes an exterior polymer layer, in accordance with an embodiment of the present disclosure.
Figure 9:
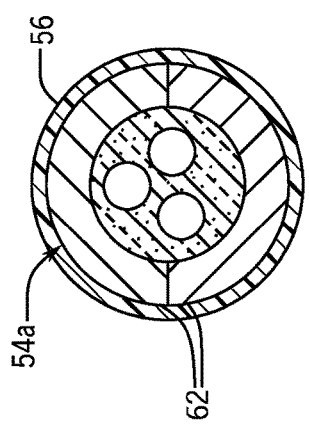
FIG. 9 is a cross-sectional view of the optical-fiber-containing circular structure of FIG. 6 that includes an exterior polymer layer, in accordance with an embodiment of the present disclosure.
Figure 8:
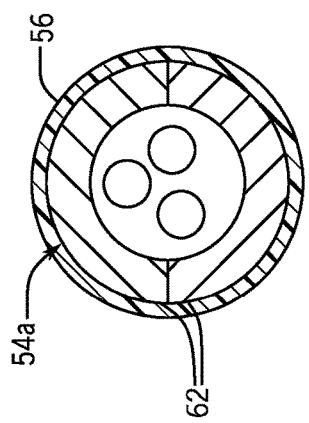
FIG. 8 is a cross-sectional view of the optical-fiber-containing circular structure of FIG. 5 that includes an exterior polymer layer, in accordance with an embodiment of the present disclosure.

Turning now to FIGS. 8-10, which relate to block 67 of FIG. 3, the thin polymer layer 56 may be extruded over the embodiments of the optical-fiber-containing circular structure 54a depicted in FIGS. 5-7, as shown in FIGS. 8-10 respectively. The thin polymer layer 56 may encase the optical-fiber-containing circular structure 54a to maintain the position of the semicircular profile steel wires 62. In another embodiment, the semicircular profile steel wires 62 may be bonded together via an adhesive (e.g., bonding glue, welding, or other) before being encased by the thin polymer layer 56.

Figure 11:
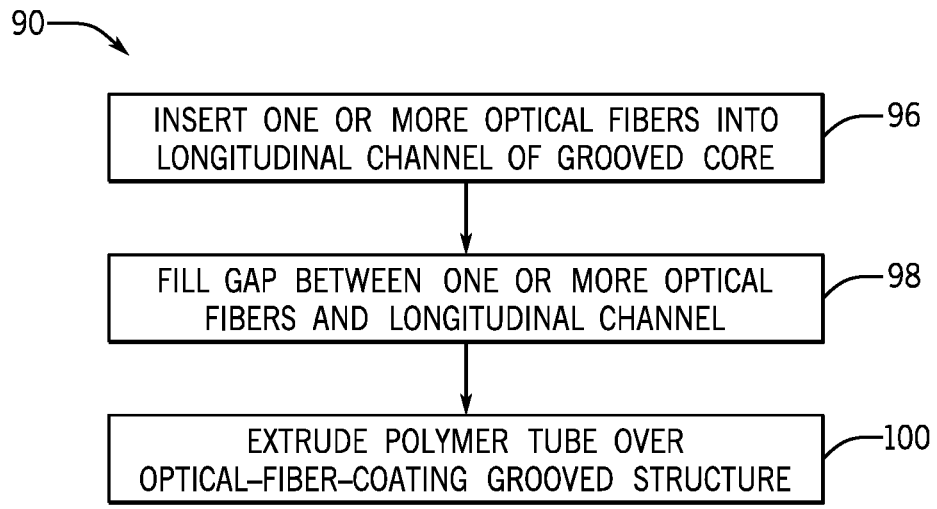
FIG. 11 is a method of manufacturing an optical-fiber-containing grooved structure of the optical-fiber-containing armor wire strength member, in accordance with an embodiment of the present disclosure.
Figure 12:
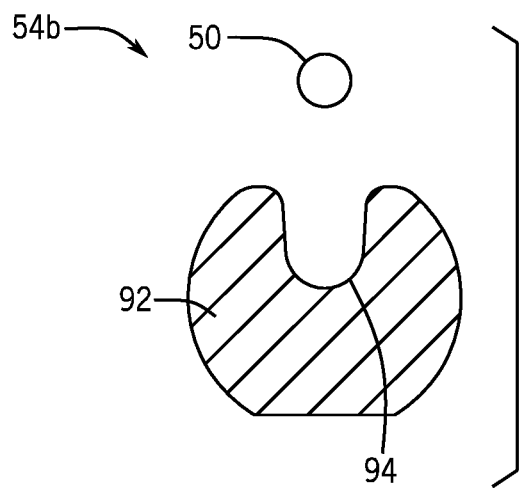
FIG. 12 is a cross-sectional view of the optical-fiber-containing grooved structure, in accordance with an embodiment of the present disclosure.

FIG. 11 is a method 90 of assembly for an optical-fiber-containing grooved structure 54b of the optical-fiber-containing armor wire strength member 52. The optical-fiber-containing grooved structure 54b and various embodiments thereof are shown in FIGS. 13-18. Block 96 relates to FIG. 12. The optical-fiber-containing grooved structure 54b may include a steel wire 92, in which a longitudinal channel 94 may extend along the length of the steel wire 92. The one or more optical fibers 50 may be disposed within the longitudinal channel 94 of the steel wire 92. The steel wire 92 may include galvanized improved plow steel, stainless steel, high carbon steel, or any suitable alloy.

Figure 15:
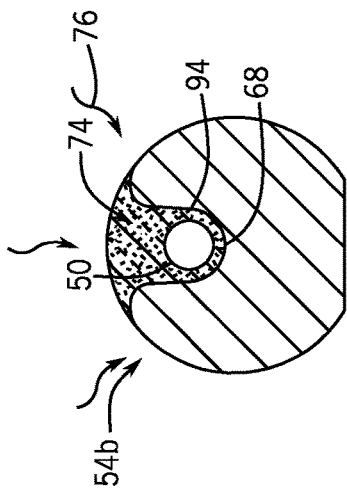
FIG. 15 is a cross-sectional view of an optical-fiber-containing grooved structure that includes a UV-curable polymer as filler material, in accordance with an embodiment of the present disclosure.
Figure 14:
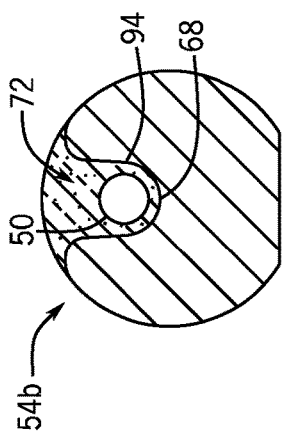
FIG. 14 is a cross-sectional view of an optical-fiber-containing grooved structure that includes a silicon polymer as filler material, in accordance with an embodiment of the present disclosure.
Figure 13:
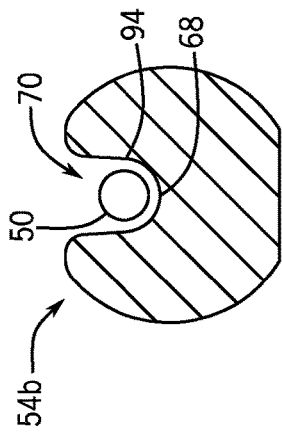
FIG. 13 is a cross-sectional view of an optical-fiber-containing grooved structure that includes air as filler material, in accordance with an embodiment of the present disclosure.

Turning now to FIGS. 13-15, which relate to block 98 of FIG. 11, when the one or more optical fibers 50 are disposed within the longitudinal channel 94, the gap 68 may form between them. The gap 68 may remain empty (e.g., filled with air 70), filled with the soft silicone polymer 72, or filled with the UV-curable polymer 74 that may be hardened using UV-radiation 76, as shown by FIGS. 13-15 respectively. Additionally or alternatively, the gap 68 may be filled with any other suitable filler material. The one or more optical fibers 50 may be encased by a filler material (e.g., air 70, soft silicone polymer 72, UV-curable polymer 74) before being disposed within the longitudinal channel 94 of the optical-fiber-containing grooved structure 54b.

Figure 18:
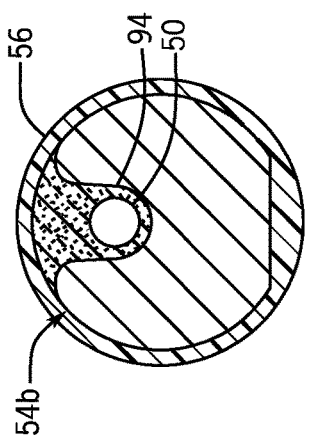
FIG. 18 is a cross-sectional view of the optical-fiber-containing grooved structure of FIG. 15 that includes an exterior polymer layer, in accordance with an embodiment of the present disclosure.
Figure 17:
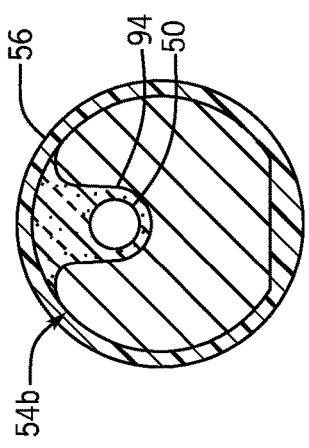
FIG. 17 is a cross-sectional view of the optical-fiber-containing grooved structure of FIG. 14 that includes an exterior polymer layer, in accordance with an embodiment of the present disclosure.
Figure 16:
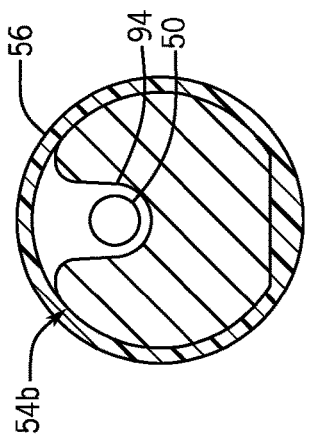
FIG. 16 is a cross-sectional view of the optical-fiber-containing grooved structure of FIG. 13 that includes an exterior polymer layer, in accordance with an embodiment of the present disclosure.

Turning now to FIGS. 16-18, which relate to block 100 of FIG. 11, the thin polymer layer 56 may be extruded over the embodiments of the optical-fiber-containing grooved structure 54b depicted in FIGS. 13-15, as shown in FIGS. 16-18 respectively. The thin polymer layer 56 may encase the optical-fiber-containing grooved structure 54b to maintain the position of the one or more optical fibers 50 within the longitudinal channel 94 of the optical-fiber-containing grooved structure 54b.

Figure 19:
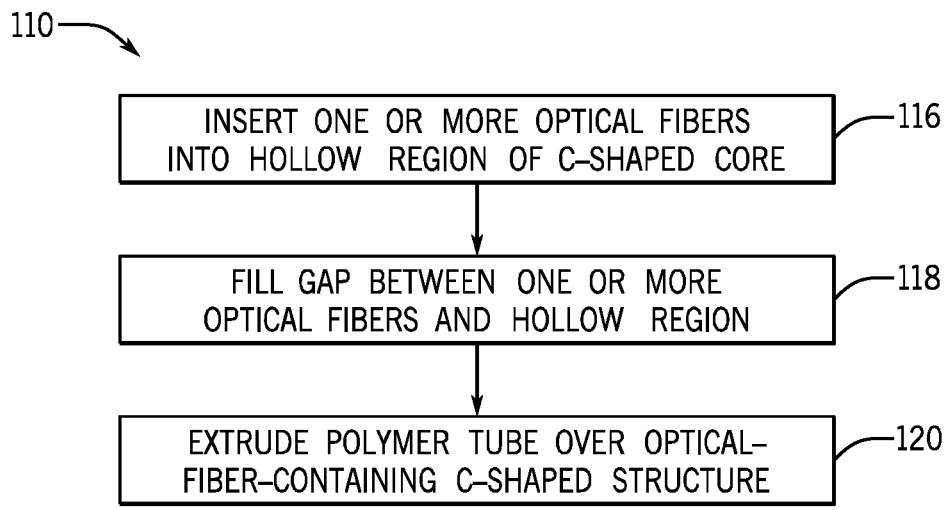
FIG. 19 is a method of manufacturing an optical-fiber-containing C-shaped structure of the optical-fiber-containing armor wire strength member, in accordance with an embodiment of the present disclosure.
Figure 20:
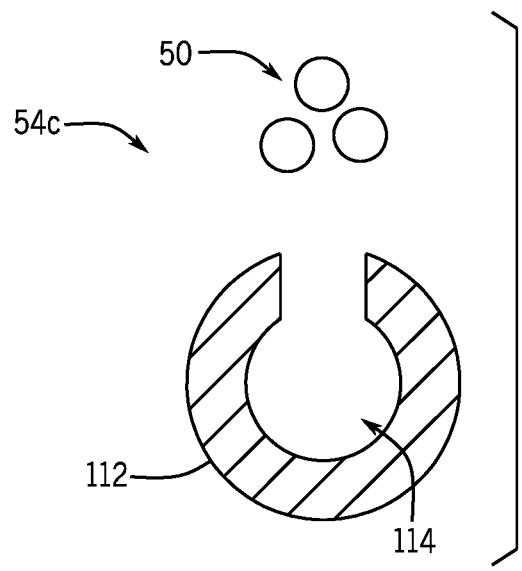
FIG. 20 is a cross-sectional view of the optical-fiber-containing C-shaped structure, in accordance with an embodiment of the present disclosure.

FIG. 19 is a method 110 of assembly for an optical-fiber-containing C-shaped structure 54c of the optical-fiber-containing armor wire strength member 52. The optical-fiber-containing C-shaped structure 54c and various embodiments thereof are shown in FIGS. 21-26. Block 116 relates to FIG. 20. The optical-fiber-containing C-shaped structure 54c may include a shaped steel wire 112, in which a hollow region 114 extends longitudinally along the length of the shaped steel wire 112. The one or more optical fibers 50 may be disposed within the hollow region 114 of the shaped steel wire 112. The shaped steel wire 112 may include galvanized improved plow steel, stainless steel, high carbon steel, or any suitable alloy.

Figure 21:
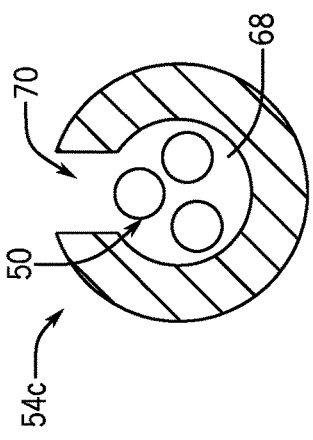
FIG. 21 is a cross-sectional view of an optical-fiber-containing C-shaped structure that includes air as filler material, in accordance with an embodiment of the present disclosure.
Figure 22:
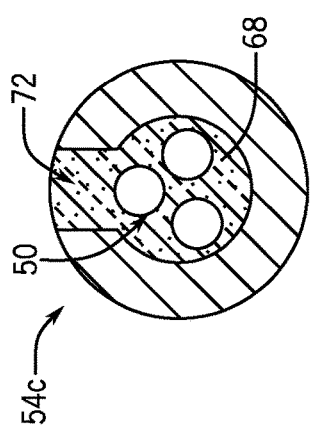
FIG. 22 is a cross-sectional view of an optical-fiber-containing C-shaped structure that includes a silicon polymer as filler material, in accordance with an embodiment of the present disclosure.
Figure 23:
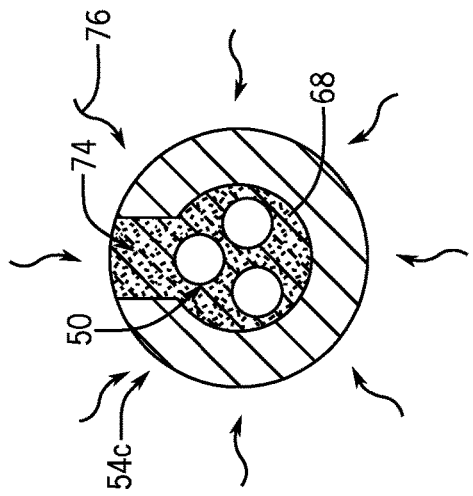
FIG. 23 is a cross-sectional view of an optical-fiber-containing C-shaped structure that includes a UV-curable polymer as filler material, in accordance with an embodiment of the present disclosure.

Turning now to FIGS. 21-23, which relate to block 118 of FIG. 19, when the one or more optical fibers 50 are disposed within the hollow region 114, the gap 68 may form between them. The gap 68 may remain empty (e.g., filled with air 70), filled with the soft silicone polymer 72, or filled with the UV-curable polymer 74 that may be hardened using UV-radiation 76, as shown by FIG. 21-23 respectively. Additionally or alternatively, the gap 68 may be filled with any other suitable filler material. The one or more optical fibers 50 may be encased by a filler material (e.g., air 70, soft silicone polymer 72, UV-curable polymer 74) before being disposed within the hollow region 114 of the shaped steel wire 112.

Figure 24:
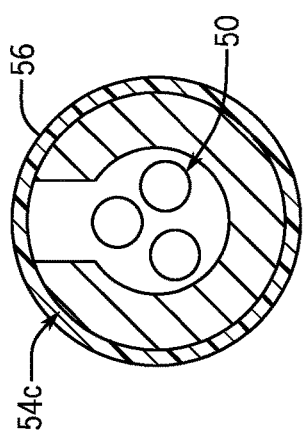
FIG. 24 is a cross-sectional view of the optical-fiber-containing C-shaped structure of FIG. 21 that includes an exterior polymer layer, in accordance with an embodiment of the present disclosure.
Figure 25:
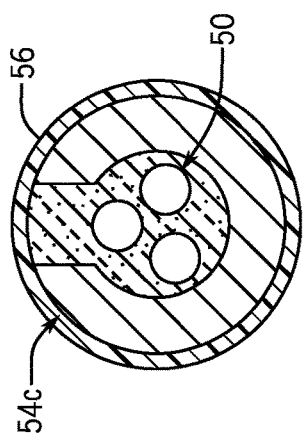
FIG. 25 is a cross-sectional view of the optical-fiber-containing C-shaped structure of FIG. 22 that includes an exterior polymer layer, in accordance with an embodiment of the present disclosure.
Figure 26:
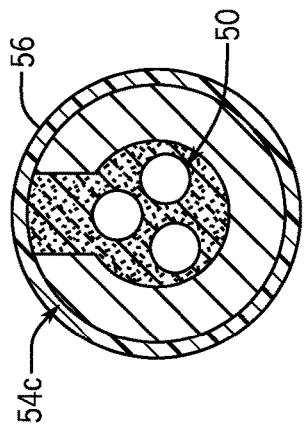
FIG. 26 is a cross-sectional view of the optical-fiber-containing C-shaped structure of FIG. 23 that includes an exterior polymer layer, in accordance with an embodiment of the present disclosure.

Turning now to FIGS. 24-26, which relate to block 120 of FIG. 19, the thin polymer layer 56 may be extruded over the embodiments of the optical-fiber-containing C-shaped structure 54c depicted in FIGS. 21-23, as shown in FIGS. 24-26 respectively. The thin polymer layer 56 may encase the optical-fiber-containing C-shaped structure 54c to maintain the position of the one or more optical fibers 50 within the hollow region 114 or the optical-fiber-containing C-shaped structure 54c.

Figure 27:
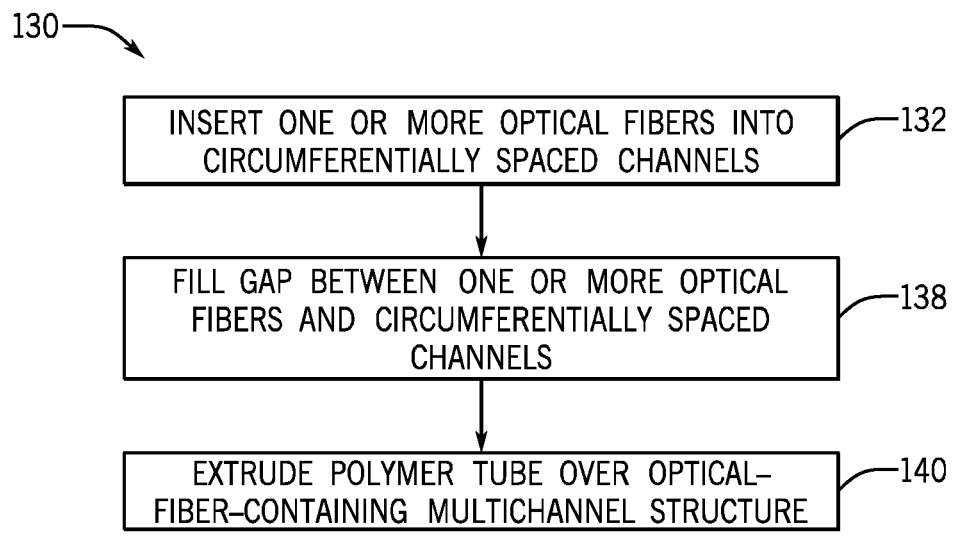
FIG. 27 is a method of manufacturing an optical-fiber-containing multichannel structure of the optical-fiber-containing armor wire strength member, in accordance with an embodiment of the present disclosure.
Figure 28:
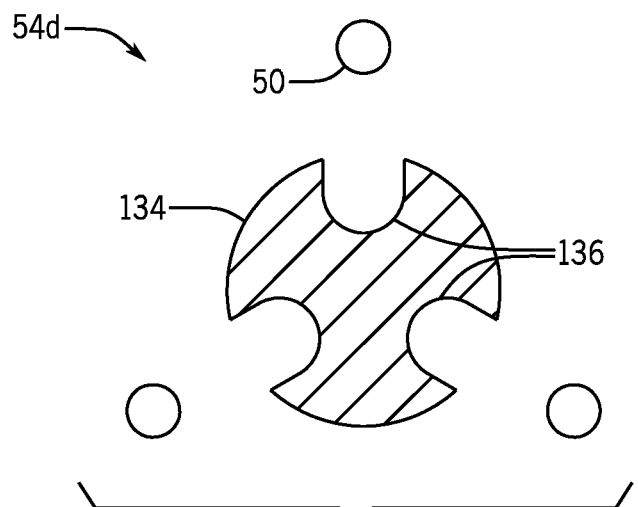
FIG. 28 is a cross-sectional view of the optical-fiber-containing multichannel structure, in accordance with an embodiment of the present disclosure.

FIG. 27 is a method 130 of assembly for an optical-fiber-containing multichannel structure 54d of the optical-fiber-containing armor wire strength members 52. The optical-fiber-containing multichannel structure 54d and various embodiments thereof are shown in FIGS. 29-34. Block 132 relates to FIG. 28. The optical-fiber-containing multichannel strength structure 54d may include a channeled steel wire 134, wherein channels 136 extend longitudinally along the length of the channeled steel wire 134. Although three channels 136 are shown in the illustrated embodiment, the channeled steel wire 134 may include 1, 2, 3, 4, 5, or more channels 136. The one or more optical fibers 50 may be disposed within the channels 136 of the channeled steel wire 134. The channeled steel wire 134 may include galvanized improved plow steel, stainless steel, high carbon steel, or any suitable alloy.

Turning now to FIGS. 29-31, which relate to block 138 of FIG. 27, when the one or more optical fibers 50 are disposed within the channels 136, gaps 68 may form between them. The gaps 68 may remain empty (e.g., filled with air 70), filled with the soft silicone polymer 72, or filled with the UV-curable polymer 74 that may be hardened using UV-radiation 76, as shown by FIG. 29-31 respectively. Additionally or alternatively, the gaps 68 may be filled with any other suitable filler material. The one or more optical fibers 50 may be encased by a filler material (e.g., air 70, soft silicone polymer 72, UV-curable polymer 74) before being disposed within the channels 136 of the optical-fiber-containing multichannel structure 54d.

Turning now to FIGS. 32-34, which relate to block 140 of FIG. 27, the thin polymer layer 56 may be extruded over the embodiments of the optical-fiber-containing multichannel structure 54d depicted in FIGS. 29-31, as shown in FIGS. 32-34 respectively. The thin polymer layer 56 may encase the optical-fiber-containing multichannel structure 54d to maintain the position of the one or more optical fibers 50 within the channels 136 or the optical-fiber-containing multichannel structure 54d.

Figure 35:
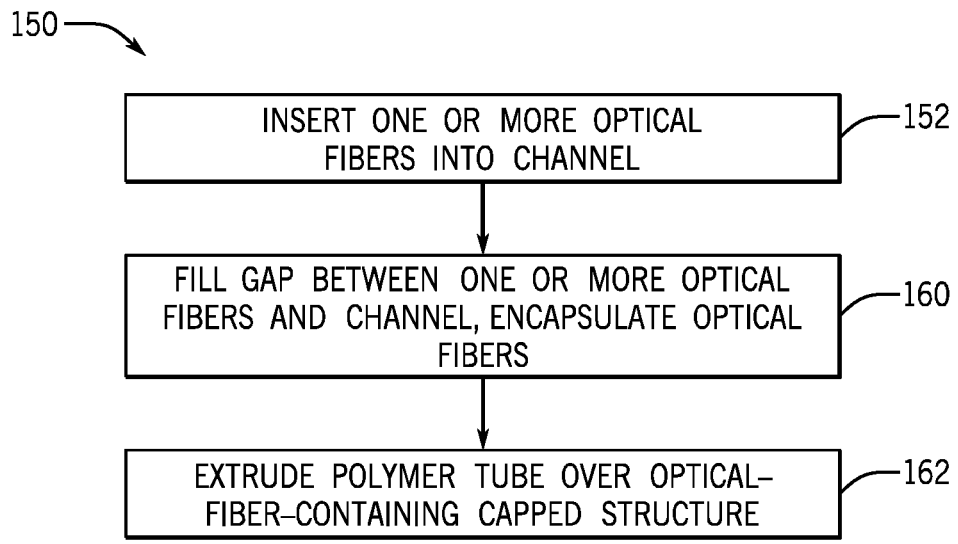
FIG. 35 is a method of manufacturing an optical-fiber-containing capped structure of the optical-fiber-containing armor wire strength member, in accordance with an embodiment of the present disclosure.
Figure 36:
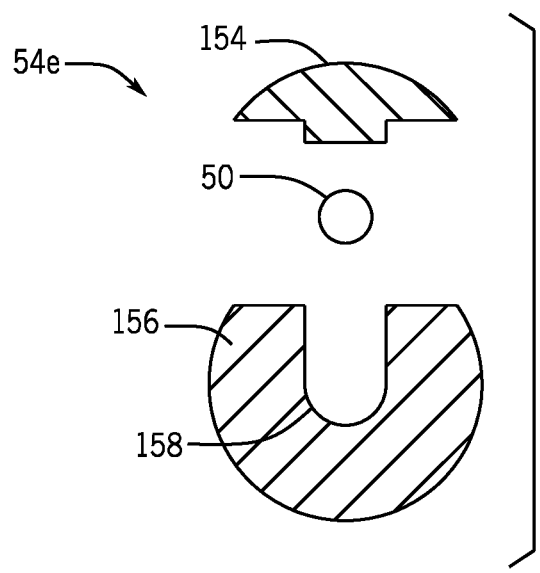
FIG. 36 is a cross-sectional view of the optical-fiber-containing capped structure described in FIG. 35, in accordance with an embodiment of the present disclosure.

FIG. 35 is a method 150 of assembly for an optical-fiber-containing capped structure 54e of the optical-fiber-containing armor wire strength members 52. The optical-fiber-containing capped structure 54e, and various embodiments thereof, are shown in FIGS. 37-45. Block 152 relates to FIG. 36. The optical-fiber-containing capped structure 54e may include a cap piece 154 and a channeled steel wire 156, in which a channel 158 extends longitudinally along the length of the channeled steel wire 156. The one or more optical fibers 50 may be disposed within the channel 158 of the channeled steel wire 156. The cap piece 154 may subsequently be coupled to the channeled steel wire 156. The cap piece 154 and/or the channeled steel wire 156 may include galvanized improved plow steel, stainless steel, high carbon steel, or any suitable alloy.

Figure 37:
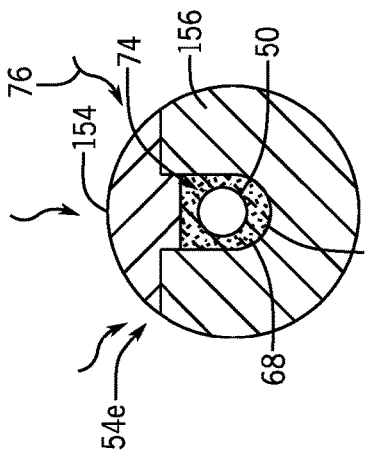
FIG. 37 is a cross-sectional view of an optical-fiber-containing capped structure that includes air as filler material, in accordance with an embodiment of the present disclosure.
Figure 38:
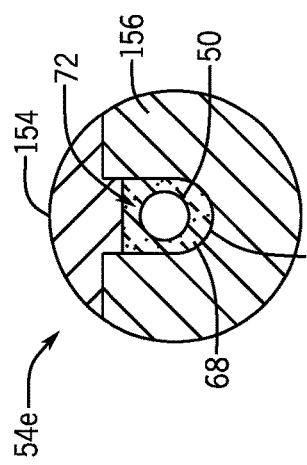
FIG. 38 is a cross-sectional view of an optical-fiber-containing capped structure that includes a silicon polymer as filler material, in accordance with an embodiment of the present disclosure.
Figure 39:
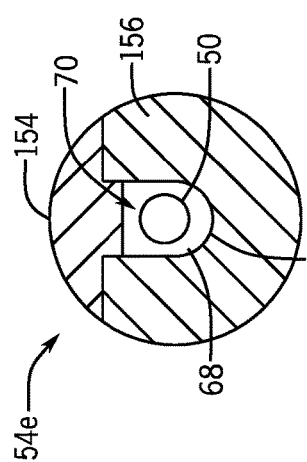
FIG. 39 is a cross-sectional view of an optical-fiber-containing capped structure that includes a UV-curable polymer as filler material, in accordance with an embodiment of the present disclosure.

Turning now to FIGS. 37-39, which relate to block 160 of FIG. 35, when the one or more optical fibers 50 are disposed within the channel 158, the gap 68 may form between them. The gap 68 may remain empty (e.g., filled with air 70), filled with the soft silicone polymer 72, or filled with the UV-curable polymer 74 that may be hardened using UV-radiation 76, as shown by FIG. 37-39 respectively. Additionally or alternatively, the gap 68 may be filled with any other suitable filler material. The one or more optical fibers 50 may be encased by a filler material (e.g., air 70, soft silicone polymer 72, UV-curable polymer 74) before being disposed within the channel 158 of the optical-fiber-containing capped strength member 54e. After the desired filler material is applied, the cap piece 154 may be disposed upon the channeled steel wire 156 to encapsulate the one or more optical fibers 50.

Figure 40:
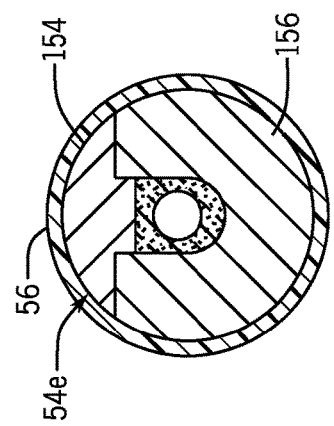
FIG. 40 is a cross-sectional view of the optical-fiber-containing capped structure of FIG. 37 that includes an exterior polymer layer, in accordance with an embodiment of the present disclosure.
Figure 41:
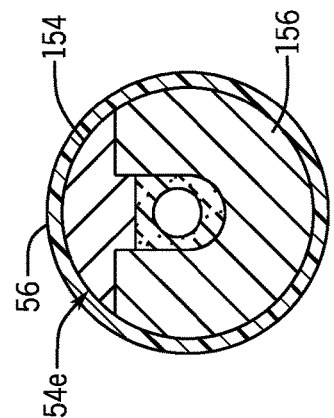
FIG. 41 is a cross-sectional view of the optical-fiber-containing capped structure of FIG. 38 that includes an exterior polymer layer, in accordance with an embodiment of the present disclosure.
Figure 42:
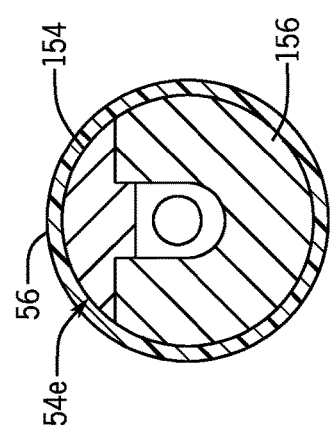
FIG. 42 is a cross-sectional view of the optical-fiber-containing capped structure of FIG. 39 that includes an exterior polymer layer, in accordance with an embodiment of the present disclosure.

Turning now to FIGS. 40-42, which relate to block 162 of FIG. 35, the thin polymer layer 56 may be extruded over the embodiments of the optical-fiber-containing capped structure 54e depicted in FIGS. 37-39, as shown in FIGS. 40-42 respectively. The thin polymer layer 56 may encase the optical-fiber-containing capped strength structure 54e to maintain the position of cap piece 154 in relation to the channeled steel wire 156.

Figure 45:
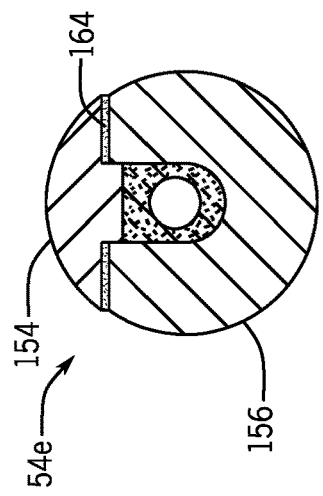
FIG. 45 is a cross-sectional view of the optical-fiber-containing capped structure of FIG. 39 that includes an adhesive bonded cap piece, in accordance with an embodiment of the present disclosure.
Figure 44:
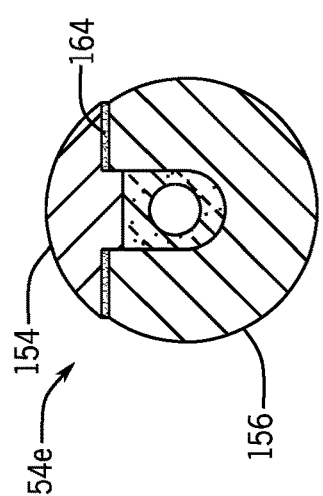
FIG. 44 is a cross-sectional view of the optical-fiber-containing capped structure of FIG. 38 that includes an adhesive bonded cap piece, in accordance with an embodiment of the present disclosure.
Figure 43:
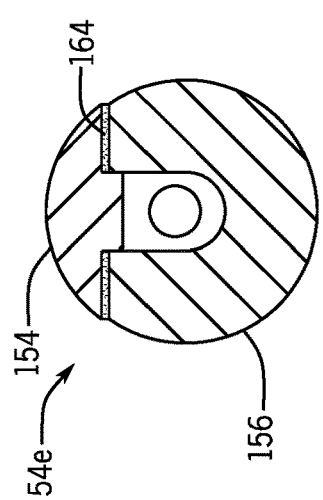
FIG. 43 is a cross-sectional view of the optical-fiber-containing capped structure of FIG. 37 that includes an adhesive bonded cap piece, in accordance with an embodiment of the present disclosure.

Turning now to FIGS. 43-45, showing additional embodiments of the optical-fiber-containing capped structure 54e shown in FIGS. 37-39 respectively, the cap piece 154 may be coupled directly to the channeled steel wire 156 via an adhesive 164 (e.g., bonding glue, welding, or other) as shown in FIGS. 43-45. In this embodiment, the thin polymer layer 56 is obsolete, such that the overall size of the optical-fiber-containing capped structure 54e may be decreased.

Figure 46:
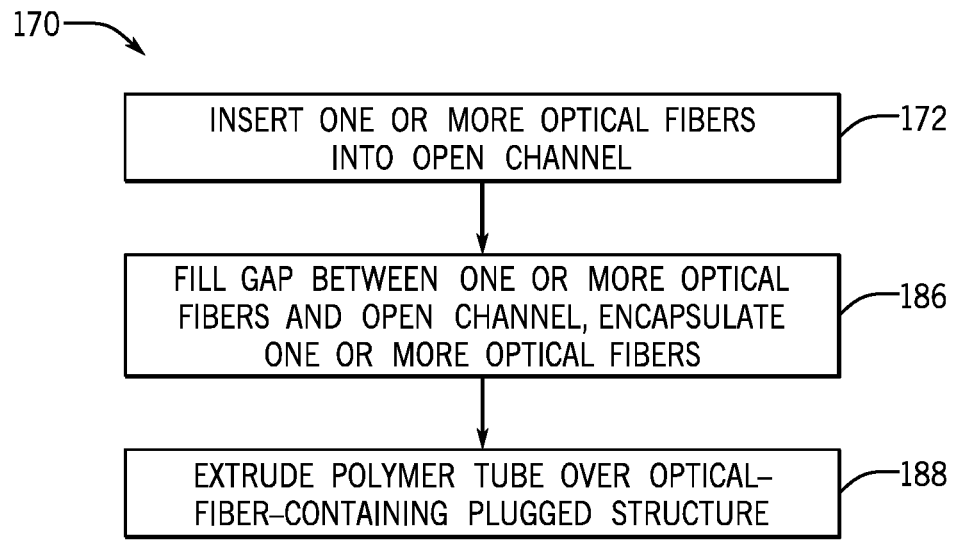
FIG. 46 is a method of manufacturing an optical-fiber-containing plugged structure of the optical-fiber-containing armor wire strength member, in accordance with an embodiment of the present disclosure.
Figure 47:
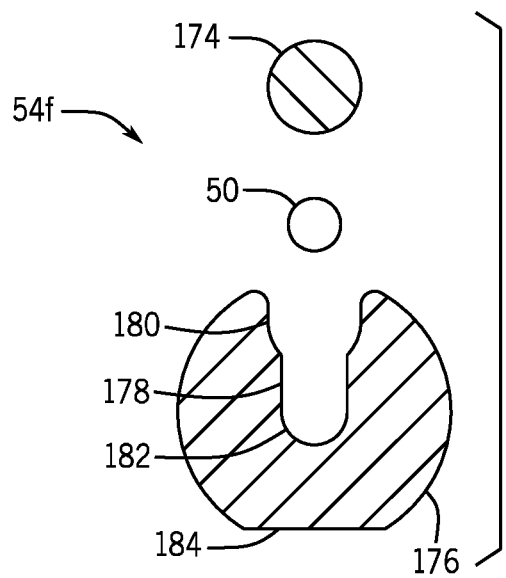
FIG. 47 is a cross-sectional view of the optical-fiber-containing plugged structure described in FIG. 46, in accordance with an embodiment of the present disclosure.

FIG. 46 is a method 170 of assembly for an optical-fiber-containing plugged structure 54f of the optical-fiber-containing armor wire strength member 52. The optical-fiber-containing plugged structure 54f, and various embodiments thereof, is shown in FIGS. 48-59. Block 172 relates to FIG. 47. The optical-fiber-containing plugged structure 54f may include a plug wire 174 and a receptor wire 176, in which a channel 178 extends longitudinally along the length of the receptor wire 176. The receptor wire 176 may include an upper end portion 156 which may house the plug wire 174 and a lower end portion 182 which may house the one or more optical fibers 50. The one or more optical fibers 50 may be placed within the lower end portion 182 of the receptor wire 176 and the plug wire 174 may be placed within the upper end portion 156 of the receptor wire 176, such that the plug wire 174 and receptor wire 176 may encapsulate the one or more optical fibers 50. The receptor wire 176 may include a flat section 184, which may facilitate manufacturing of the embodiment. The plug wire 174 and/or the receptor wire 176 may include galvanized improved plow steel, stainless steel, high carbon steel, or any suitable alloy.

Figure 48:
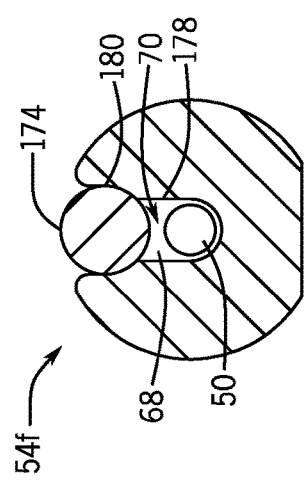
FIG. 48 is a cross-sectional view of an optical-fiber-containing plugged structure that includes air as filler material, in accordance with an embodiment of the present disclosure.
Figure 49:
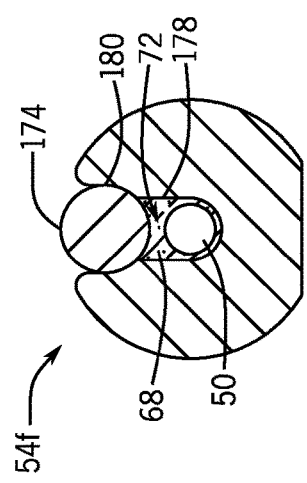
FIG. 49 is a cross-sectional view of an optical-fiber-containing plugged structure that includes a silicon polymer as filler material, in accordance with an embodiment of the present disclosure.
Figure 50:
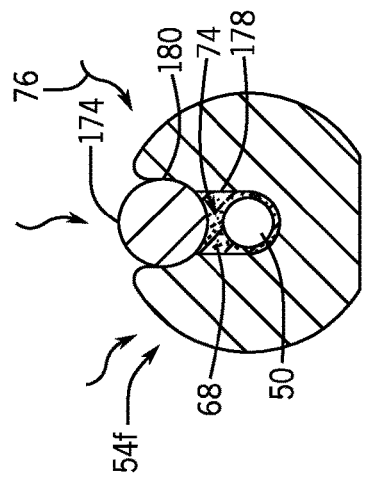
FIG. 50 is a cross-sectional view of an optical-fiber-containing plugged structure that includes a UV-curable polymer as filler material, in accordance with an embodiment of the present disclosure.

Turning now to FIGS. 48-50, which relate to block 186 of FIG. 46, when the one or more optical fibers 50 are disposed within the channel 178, the gap 68 may form between them. The gap 68 may remain empty (e.g., filled with air 70), filled with the soft silicone polymer 72, or filled with the UV-curable polymer 74 that may be hardened using UV-radiation 76, as shown by FIG. 48-50 respectively. Additionally or alternatively, the gap 68 may be filled with any other suitable filler material. The one or more optical fibers 50 may be encased by a filler material (e.g., air 70, soft silicone polymer 72, UV-curable polymer 74) before being disposed within the channel 178 of the optical-fiber-containing plugged structure 54f. After the desired filler is applied, the plug wire 174 may be disposed upon the upper end portion 156 of the receptor wire 176 to encapsulate the one or more optical fibers 50.

Figure 51:
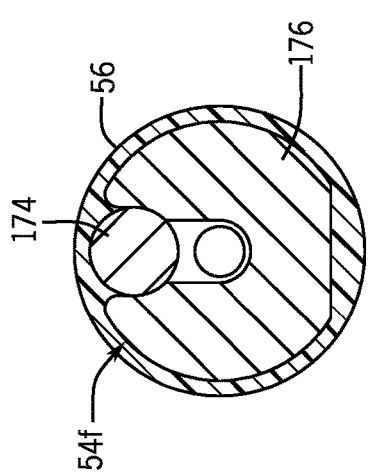
FIG. 51 is a cross-sectional view of the optical-fiber-containing plugged structure of FIG. 48 that includes an exterior polymer layer, in accordance with an embodiment of the present disclosure.
Figure 52:
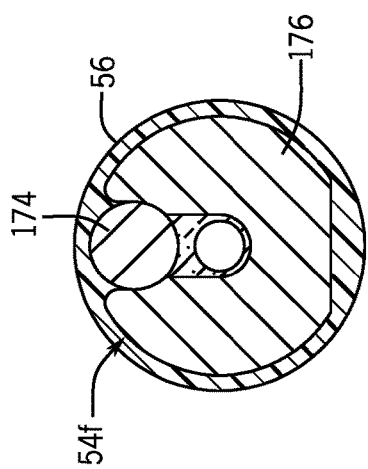
FIG. 52 is a cross-sectional view of the optical-fiber-containing plugged structure of FIG. 49 that includes an exterior polymer layer, in accordance with an embodiment of the present disclosure.
Figure 53:
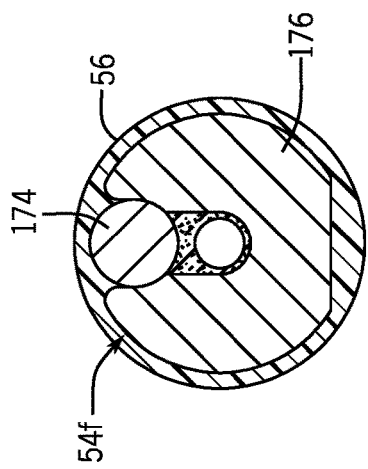
FIG. 53 is a cross-sectional view of the optical-fiber-containing plugged structure of FIG. 50 that includes an exterior polymer layer, in accordance with an embodiment of the present disclosure.

Turning now to FIGS. 51-53, which relate to block 188 of FIG. 46, the thin polymer layer 56 may be extruded over the embodiments of the optical-fiber-containing plugged structure 54f depicted in FIGS. 48-50, as shown in FIGS. 51-53 respectively. The thin polymer layer 56 may encase the optical-fiber-containing plugged structure 54f to maintain the position of plug wire 174 in relation to the receptor wire 176.

Figure 54:
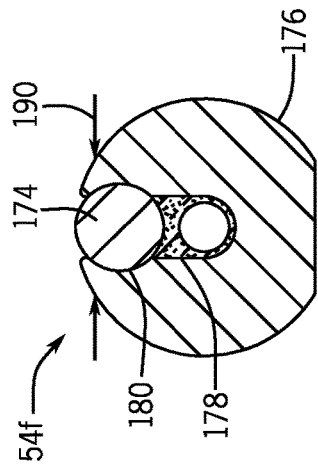
FIG. 54 is a cross-sectional view of the optical-fiber-containing plugged structure of FIG. 48 that includes a crimped plug wire, in accordance with an embodiment of the present disclosure.
Figure 55:
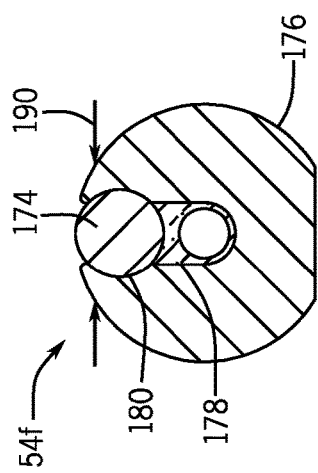
FIG. 55 is a cross-sectional view of the optical-fiber-containing plugged structure of FIG. 49 that includes a crimped plug wire, in accordance with an embodiment of the present disclosure.
Figure 56:
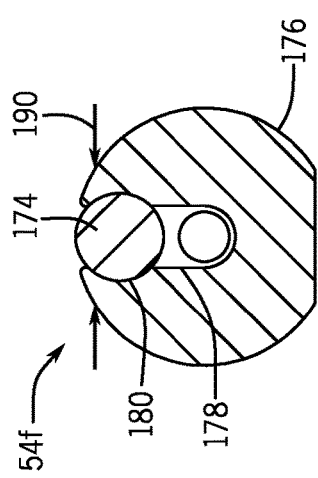
FIG. 56 is a cross-sectional view of the optical-fiber-containing plugged structure of FIG. 50, a crimped plug wire, in accordance with an embodiment of the present disclosure.

Turning now to FIGS. 54-56, showing additional embodiments of the optical-fiber-containing plugged structure 54f shown in FIGS. 48-50 respectively, the plug wire 174 may be press fit into the receptor wire 176 via a crimping force 190. The crimping force 190 may compresses the upper end portion 156 of the channel 178 within the receptor wire 176, such that the plug wire 174 may be permanently coupled to the receptor wire 176. In this embodiment, the thin polymer layer 56 may be obsolete, such that the overall size of the optical-fiber-containing plugged structure 54f may be decreased.

Figure 57:
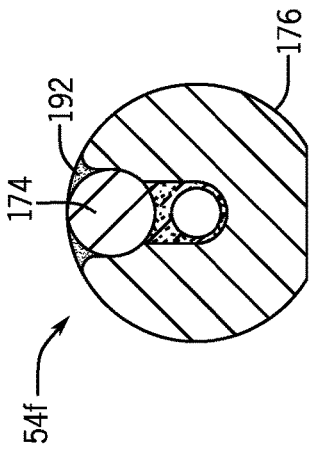
FIG. 57 is a cross-sectional view of the optical-fiber-containing plugged structure of FIG. 48 that includes a welded plug wire, in accordance with an embodiment of the present disclosure.
Figure 58:
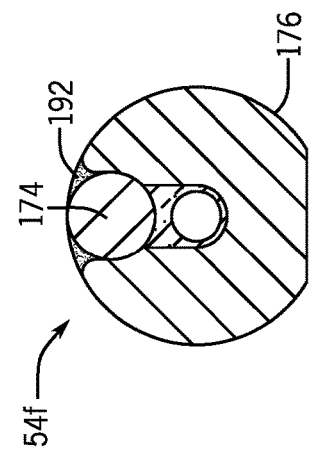
FIG. 58 is a cross-sectional view of the optical-fiber-containing plugged structure of FIG. 49 that includes a welded plug wire, in accordance with an embodiment of the present disclosure.
Figure 59:
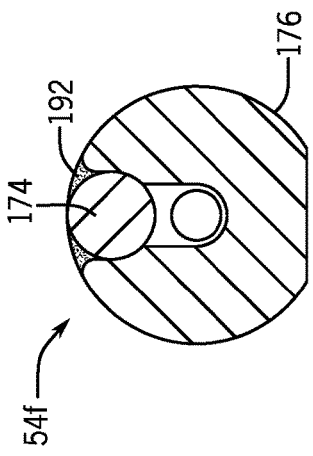
FIG. 59 is a cross-sectional view of the optical-fiber-containing plugged structure of FIG. 50 that includes a welded plug wire, in accordance with an embodiment of the present disclosure.
Figure 60:
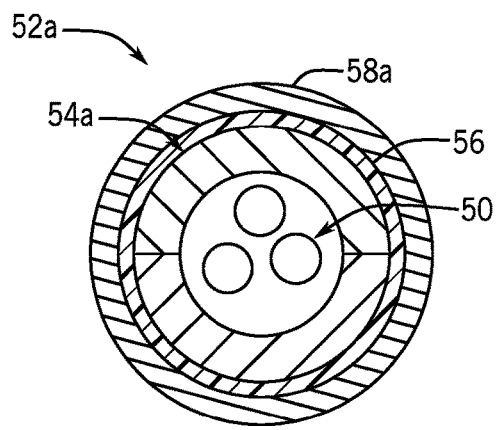
FIG. 60 is a cross-sectional view of an optical-fiber-containing armor wire strength member that includes the optical-fiber-containing circular structure of FIG. 8 encased by a snug fitting exterior metallic tube, in accordance with an embodiment of the present disclosure.
Figure 61:
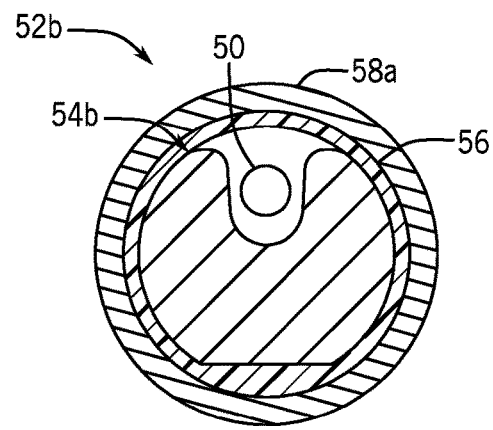
FIG. 61 is a cross-sectional view of an optical-fiber-containing armor wire strength member that includes the optical-fiber-containing grooved structure of FIG. 16 encased by a snug fitting exterior metallic tube, in accordance with an embodiment of the present disclosure.
Figure 62:
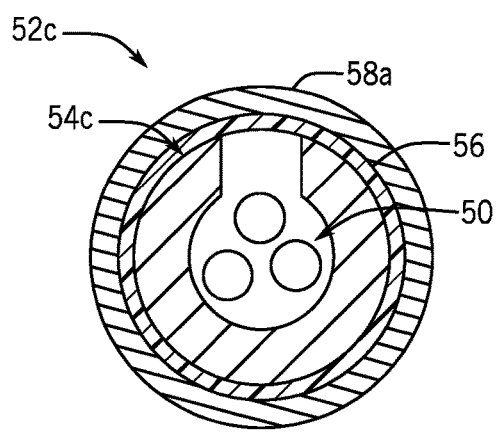
FIG. 62 is a cross-sectional view of an optical-fiber-containing armor wire strength member that includes the optical-fiber-containing C-shaped structure of FIG. 24 encased by a snug fitting exterior metallic tube, in accordance with an embodiment of the present disclosure.
Figure 63:
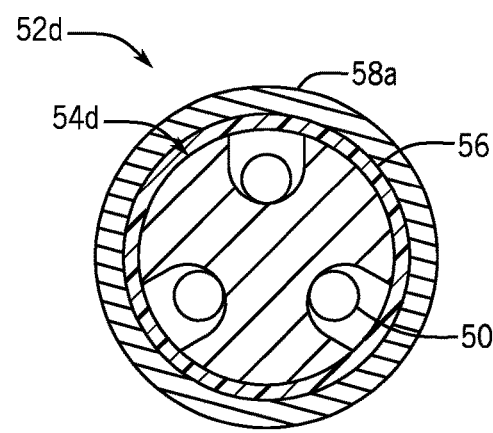
FIG. 63 is a cross-sectional view of an optical-fiber-containing armor wire strength member that includes the optical-fiber-containing multichannel structure of FIG. 32 encased by a snug fitting exterior metallic tube, in accordance with an embodiment of the present disclosure.
Figure 64:
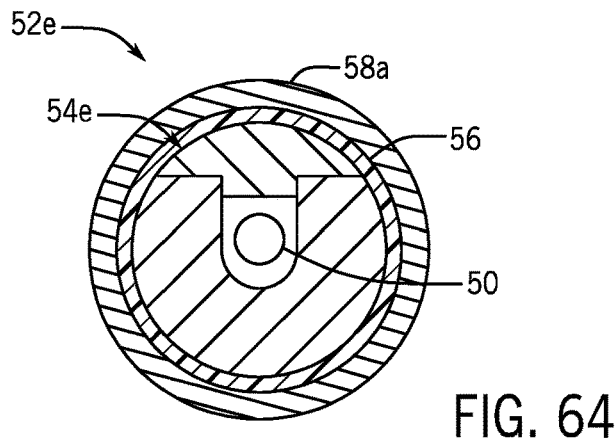
FIG. 64 is a cross-sectional view of an optical-fiber-containing armor wire strength member that includes the optical-fiber-containing capped structure of FIG. 40 encased by a snug fitting exterior metallic tube, in accordance with an embodiment of the present disclosure.
Figure 65:
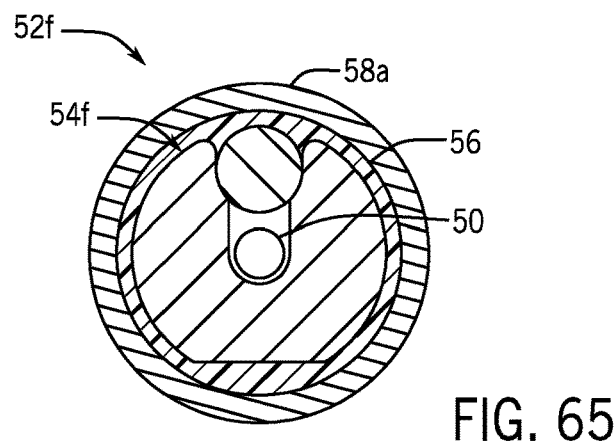
FIG. 65 is a cross-sectional view of an optical-fiber-containing armor wire strength member that includes the optical-fiber-containing plugged structure of FIG. 51 encased by a snug fitting exterior metallic tube, in accordance with an embodiment of the present disclosure.

Turning now to FIGS. 57-59, showing additional embodiments of the optical-fiber-containing plugged structure 54f shown in FIGS. 48-50 respectively. The plug wire 174 may be directly coupled to the receptor wire 176 via an adhesive 192 (e.g., welding, bonding glue, or other). In this embodiment, the thin polymer layer 56 is obsolete, such that the overall size of the optical-fiber-containing plugged structure 54f may be decreased.

Turning now to FIGS. 60-65, showing various embodiments of the optical-fiber-containing armor wire strength members 52 of FIG. 2 (52a, 52b, 52c, 52d, 52e, 52f respectively). Supplementary support structures may be coupled with the optical-fiber-containing structures 54 to provide additional strength, protection, and/or rigidity to the various embodiments of the optical-fiber-containing structures 54. FIGS. 60-65 relate to embodiments of the optical-fiber-containing circular structure 54a, optical-fiber-containing grooved structure 54b, optical-fiber-containing C-shaped structure 54c, optical-fiber-containing multichannel structure 54d, optical-fiber-containing capped structure 54e, and optical-fiber-containing plugged structure 54f respectively. Each embodiment may be encased by the thin polymer layer 56. In addition, the thin polymer layer 56 of each embodiment may be circumferentially enclosed by a seam welded tube 58a, which may fit tightly about the thin polymer layer 56. The seam welded tube 58a may physically protect the thin polymer layer 56, the optical-fiber-containing structure 54, and/or the one or more optical fibers 50 disposed within the seam welded tube 58a.

Figure 66:
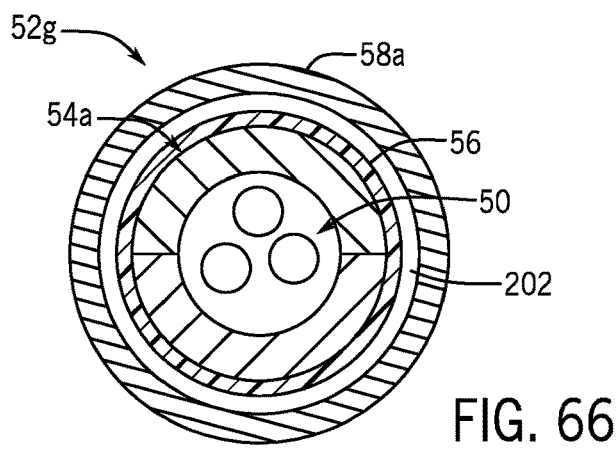
FIG. 66 is a cross-sectional view of an optical-fiber-containing armor wire strength member that includes the optical-fiber-containing circular structure of FIG. 8 encased a loose-fitting exterior metallic tube, in accordance with an embodiment of the present disclosure.
Figure 67:
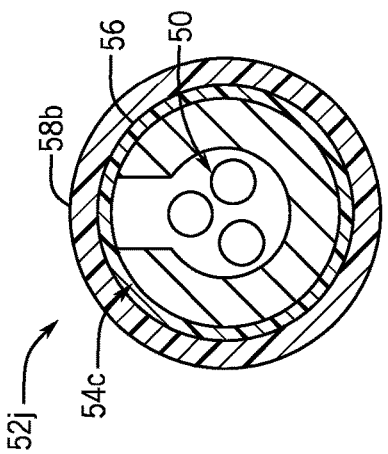
FIG. 67 is a cross-sectional view of an optical-fiber-containing armor wire strength member that includes the optical-fiber-containing circular structure of FIG. 8 encased by a polymer jacket, in accordance with an embodiment of the present disclosure.
Figure 70:
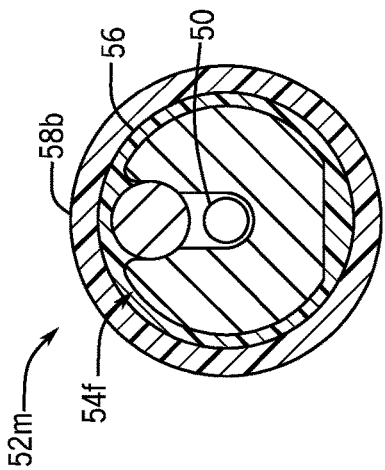
FIG. 70 is a cross-sectional view of an optical-fiber-containing armor wire strength member that includes the optical-fiber-containing multichannel structure of FIG. 32 encased by a polymer jacket, in accordance with an embodiment of the present disclosure.
Figure 68:
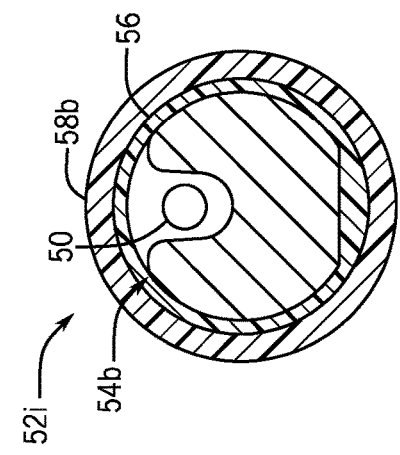
FIG. 68 is a cross-sectional view of an optical-fiber-containing armor wire strength member that includes the optical-fiber-containing grooved structure of FIG. 16 encased by a polymer jacket, in accordance with an embodiment of the present disclosure.
Figure 71:
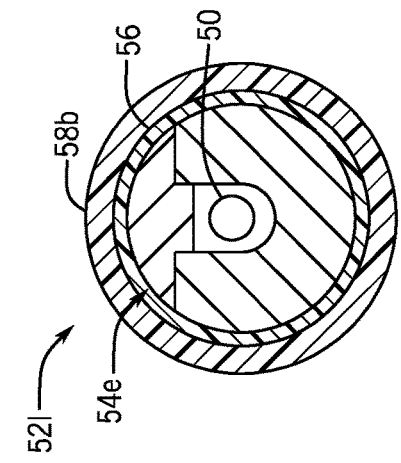
FIG. 71 is a cross-sectional view of an optical-fiber-containing armor wire strength member that includes the optical-fiber-containing capped structure of FIG. 40 encased by a polymer jacket, in accordance with an embodiment of the present disclosure.
Figure 69:
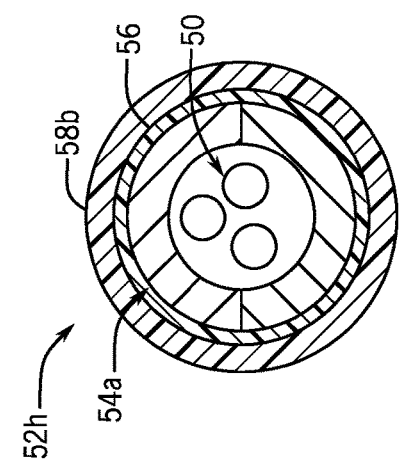
FIG. 69 is a cross-sectional view of an optical-fiber-containing armor wire strength member that includes the optical-fiber-containing C-shaped structure of FIG. 24 encased by a polymer jacket, in accordance with an embodiment of the present disclosure.
Figure 72:
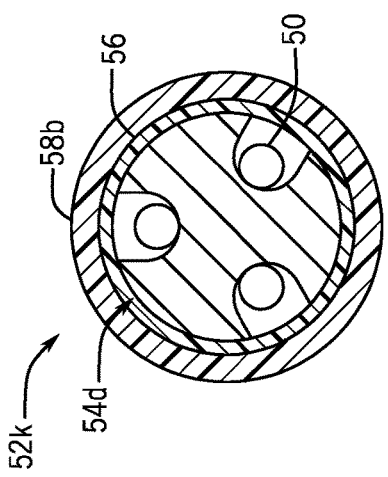
FIG. 72 is a cross-sectional view of an optical-fiber-containing armor wire strength member that includes the optical-fiber-containing plugged structure of FIG. 51 encased a polymer jacket, in accordance with an embodiment of the present disclosure.
Figure 73:
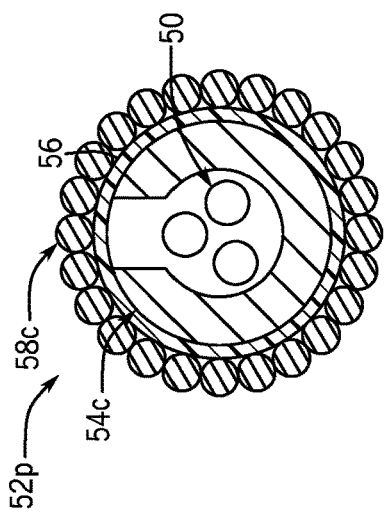
FIG. 73 is a cross-sectional view of an optical-fiber-containing armor wire strength member that includes the optical-fiber-containing circular structure of FIG. 8 encased by a served wire jacket, in accordance with an embodiment of the present disclosure.
Figure 74:
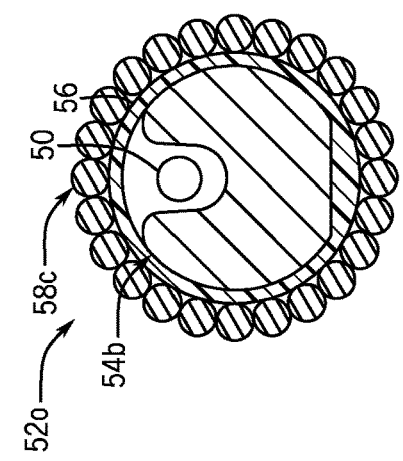
FIG. 74 is a cross-sectional view of an optical-fiber-containing armor wire strength member that includes the optical-fiber-containing grooved structure of FIG. 16 encased by a served wire jacket, in accordance with an embodiment of the present disclosure.
Figure 75:
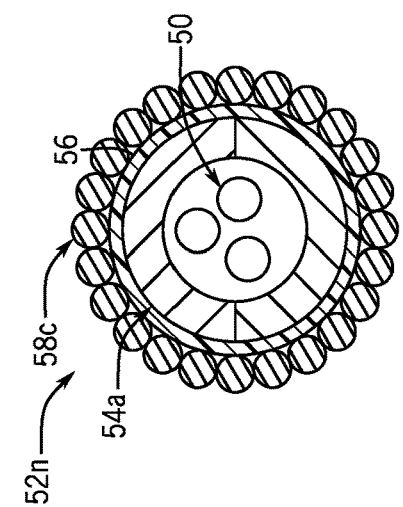
FIG. 75 is a cross-sectional view of an optical-fiber-containing armor wire strength member that includes the optical-fiber-containing C-shaped structure of FIG. 24 encased by a served wire jacket, in accordance with an embodiment of the present disclosure.
Figure 76:
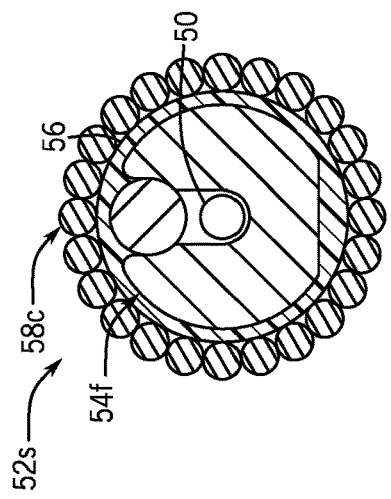
FIG. 76 is a cross-sectional view of an optical-fiber-containing armor wire strength member that includes the optical-fiber-containing multichannel structure of FIG. 32 encased by a served wire jacket, in accordance with an embodiment of the present disclosure.
Figure 77:
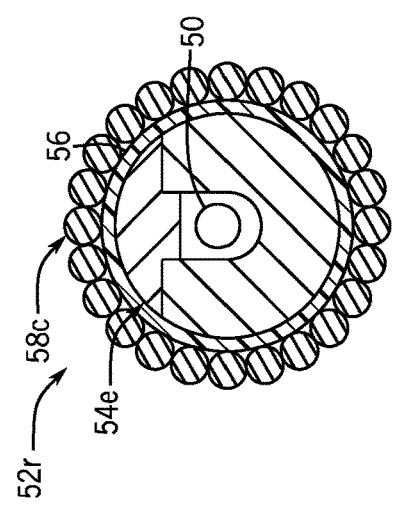
FIG. 77 is a cross-sectional view of an optical-fiber-containing armor wire strength member that includes the optical-fiber-containing capped structure of FIG. 40 encased by a served wire jacket, in accordance with an embodiment of the present disclosure.

Turning now to FIG. 66, showing another embodiment of the optical-fiber-containing armor wire strength member 52g. In this embodiment, the seam welded tube 58a may be loosely disposed about the thin polymer layer 56 and the optical-fiber-containing circular strength structure 54a. An annular gap 202 may exist between the seam welded tube 58a and the thin polymer layer 56. Although the embodiment shown composes the optical-fiber-containing circular structure 54a, the seam welded tube 58a may also be disposed loosely about any other embodiment of the core 54, such as the optical-fiber-containing grooved structure 54b, optical-fiber-containing C-shaped structure 54c, optical-fiber-containing multichannel structure 54d, optical-fiber-containing capped structure 54e, optical-fiber-containing plugged structure 54f, or others.

Turning now to FIGS. 67-72, showing various embodiments of the optical-fiber-containing armor wire strength members 52 of FIG. 2 (52h, 52i, 52j, 52k, 52l, 52m respectively). Supplementary support structures may be coupled with the optical-fiber-containing structures 54 to provide additional strength, protection, and/or rigidity to the various embodiments of the optical-fiber-containing structures 54. FIGS. 67-72 relate to embodiments of the optical-fiber-containing circular structure 54a, optical-fiber-containing grooved structure 54b, optical-fiber-containing C-shaped structure 54c, optical-fiber-containing multichannel structure 54d, optical-fiber-containing capped structure 54e, and optical-fiber-containing plugged structure 54f respectively. Each embodiment may be encased by a thin polymer layer 56. In addition, the thin polymer layer 56 of each embodiment may be circumferentially enclosed by a thick polymer jacket 58b. The thick polymer jacket 58b may be compression-extruded over the thin polymer layer 56 of the various embodiments. The thick polymer jacket 58b may physically protect the thin polymer layer 56, optical-fiber-containing structure 54, and/or the one or more optical fibers 50 disposed within the thick polymer jacket 58b.

Turning now to FIGS. 73-78, showing various embodiments of the optical-fiber-containing armor wire strength members 52 of FIG. 2 (52n, 52o, 52p, 52q, 52r, 52s respectively). Supplementary support structures may be coupled with the core 54 to provide additional strength, protection, and/or rigidity to the various embodiments of the optical-fiber-containing structure 54. FIGS. 73-78 relate to embodiments of the optical-fiber-containing circular structure 54a, optical-fiber-containing grooved structure 54b, optical-fiber-containing C-shaped structure 54c, optical-fiber-containing multichannel structure 54d, optical-fiber-containing capped structure 54e, and optical-fiber-containing plugged structure 54f respectively. Each embodiment may be encased by a thin polymer layer 56. In addition, the thin polymer layer 56 of each embodiment may be circumferentially enclosed by one or more metallic wires 58c (e.g., wire jacket). The metallic wires 58c may be served (e.g., cabled helically) over the thin polymer layer 56. In another embodiment, the metallic wires 58c may extend longitudinally along the exterior surface of the thin polymer layer 56, or in any suitable fashion to cover the exterior surface of the thin polymer layer 56. The metallic wires 58c may physically protect the thin polymer layer 56, optical-fiber-containing structure 54, and/or the one or more optical fibers 50 disposed within the casing of metallic wires 58c.

The specific embodiments described above have been shown by way of example, and it should be understood that these embodiments may be susceptible to various modifications and alternative forms. The disclosed embodiments are suitable for any cable application requiring optical fiber sensors near the outer circumference of a cable, such as wireline cables, wireline cables with partially for fully jacketed strength members, and marine seismic cables. It should be further understood that the claims are not intended to be limited to the particular forms disclosed, but rather to cover all modifications, equivalents, and alternatives falling within the spirit and scope of this disclosure.

The invention claimed is:

1. A cable comprising:
   a cable core; and
   a plurality of armor wire strength members that surround the cable core, wherein a first armor wire strength member of the plurality of armor wire strength members comprises a grooved interior space that houses a first optical fiber, wherein the grooved interior space is disposed within a channel in the first armor wire strength member, and wherein the grooved interior space is isolated within the channel via a cap shaped to fit into the channel and cause the first armor wire strength member to have a circular cross-section.

2. The cable of claim 1, wherein the first armor wire strength member is disposed among an outermost periphery of the plurality of armor wire strength members.

3. The cable of claim 1, wherein the cable comprises a marine cable and wherein the plurality of armor wire strength members are disposed within a shielding layer that surrounds the cable core.

4. The cable of claim 1, wherein the grooved interior space is filled with a gas.

5. The cable of claim 4, wherein the gas comprises air.

6. The cable of claim 1, wherein the grooved interior space is filled with a silicon polymer.

7. The cable of claim 1, wherein the grooved interior space is filled with an ultraviolet-curable polymer.

8. The cable of claim 1, wherein the grooved interior space comprises a first longitudinal channel first armor wire strength member.

9. The cable of claim 8, wherein the first armor wire strength member comprises a second grooved interior space that houses a second optical fiber, wherein the second grooved interior space comprises a second longitudinal channel in the wire.

10. The cable of claim 1, wherein a second armor wire strength member of the plurality of armor wire strength members does not comprise a grooved interior space.

11. A cable comprising:
    a first plurality of wire members disposed circumferentially at a first radial distance from a center of the cable, wherein at least one wire member of the first plurality of wire members comprises a first grooved interior space that houses a first optical fiber, wherein the first grooved interior space is disposed within a channel of the at least one wire member of the first plurality of wire members, and wherein the first grooved interior space is isolated within the channel via a cap shaped to fit into the channel and cause the least one wire member to have a circular cross-section; and
    a second plurality of wire members disposed circumferentially at a second radial distance from the center of the cable, wherein the second radial distance is greater than the first radial distance, wherein at least one wire member of the second plurality of wire members comprises a second grooved interior space that houses a second optical fiber.

12. A cable comprising:
    a cable core; and
    a plurality of armor wire strength members that surround the cable core, wherein a first armor wire strength member of the plurality of armor wire strength members comprises a grooved interior space that houses a first optical fiber, wherein the grooved interior space is disposed within a single wire having a channel, and wherein the grooved interior space is isolated within the channel via a plug wire that has a fully rounded profile.

* * * * *